(12) United States Patent
Kishida

(10) Patent No.: US 9,160,878 B2
(45) Date of Patent: Oct. 13, 2015

(54) SERVER APPARATUS THAT ENABLES EASY USE OF IMAGE INPUT APPARATUS, INFORMATION PROCESSING APPARATUS, METHODS OF CONTROLLING THE APPARATUSES, CONTROL PROGRAM, AND STORAGE MEDIUM

(75) Inventor: Akira Kishida, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 254 days.

(21) Appl. No.: 13/574,818

(22) PCT Filed: May 31, 2012

(86) PCT No.: PCT/JP2012/064617
§ 371 (c)(1),
(2), (4) Date: Jul. 24, 2012

(87) PCT Pub. No.: WO2012/165659
PCT Pub. Date: Dec. 6, 2012

(65) Prior Publication Data
US 2012/0307306 A1    Dec. 6, 2012

(30) Foreign Application Priority Data
Jun. 1, 2011    (JP) .................. 2011-123637

(51) Int. Cl.
*G06F 3/12* (2006.01)
*H04N 1/00* (2006.01)
*H04N 1/32* (2006.01)
(52) U.S. Cl.
CPC ....... *H04N 1/00973* (2013.01); *H04N 1/32507* (2013.01); *H04N 2201/3212* (2013.01)

(58) Field of Classification Search
CPC .................. H04N 1/00973; H04N 1/32507
USPC ........................................... 358/1.15
See application file for complete search history.

(56) References Cited

U.S. PATENT DOCUMENTS

| 6,289,371 | B1 * | 9/2001 | Kumpf et al. ............ 709/203 |
| 7,644,119 | B1 * | 1/2010 | Anooshfar .............. 709/203 |
| 2006/0053124 | A1 * | 3/2006 | Nishio et al. ............ 707/100 |
| 2006/0087684 | A1 * | 4/2006 | Dokuni ................. 358/1.15 |

(Continued)

FOREIGN PATENT DOCUMENTS

| JP | 2000-036892 A | 2/2000 |
| JP | 2000-148649 A | 5/2000 |

(Continued)

*Primary Examiner* — Benjamin O Dulaney
(74) *Attorney, Agent, or Firm* — Rossi, Kimms & McDowell LLP

(57) ABSTRACT

An arrangement for enabling a user to easily use an image input apparatus. A server apparatus capable of communicating with an information processing apparatus creates a list of image input apparatuses found through a search by the information processing apparatus, and provides the list to the same. The server apparatus provides script information including information for configuring operation settings of an image input apparatus selected from the provided list, to the information processing apparatus, and transmits a job message to the same, for causing the image input apparatus to operate according to the operation settings, in order to cause the information processing apparatus to transfer the job message to the image input apparatus. Image data input by the operation of the image input apparatus according to the job message is acquired via the information processing apparatus, and is stored in the server apparatus.

4 Claims, 15 Drawing Sheets

(56) References Cited

U.S. PATENT DOCUMENTS

| | | | |
|---|---|---|---|
| 2006/0209359 A1* | 9/2006 | Kadowaki | 358/474 |
| 2010/0118330 A1* | 5/2010 | Feijoo et al. | 358/1.15 |
| 2011/0157215 A1* | 6/2011 | Aoyagi | 345/593 |

FOREIGN PATENT DOCUMENTS

| | | |
|---|---|---|
| JP | 2001-274943 A | 10/2001 |
| JP | 2011-050014 A | 3/2011 |

* cited by examiner

SERVER APPARATUS THAT ENABLES EASY USE OF IMAGE INPUT APPARATUS, INFORMATION PROCESSING APPARATUS, METHODS OF CONTROLLING THE APPARATUSES, CONTROL PROGRAM, AND STORAGE MEDIUM

TECHNICAL FIELD

The present invention relates to a server apparatus for inputting images using a network, an information processing apparatus, respective methods of controlling the apparatuses, a control program, and a storage medium.

BACKGROUND ART

To use a peripheral apparatus, such as an image input apparatus, from an information processing apparatus, generally, it is necessary to install a specific device driver compatible with the peripheral apparatus (e.g. a scanner driver in the case of an image input apparatus) in an operating system (hereinafter referred to as the "OS") which operates on the information processing apparatus.

When using an image input apparatus, a scanner driver is started from an application, settings necessary for a scanning operation are made, the image input apparatus is driven, and then acquired image data is transferred to the application, whereby the application is enabled to freely handle the image data.

Therefore, conventionally, it is required that scanner drivers have been made available each of which is compatible with both of an image input apparatus to be used and an OS operating on an information processing apparatus. This generates a situation in which a user is required to search a proper scanner driver which operates according to a combination of an OS and an image input apparatus.

Further, users are sometimes required to perform a troublesome work, such as installation of a scanner driver into the OS. On the other hand, manufacturers and sellers of image input apparatuses are required to supply scanner drivers compatible with OS types which have been recently increased in number. Thus, the work for coping with the necessity of installing an appropriate driver is ever increasing.

On the other hand, there has been proposed a method of realizing a function equivalent to the operation of a scanner driver by accessing a Web page hosted by a PC (personal computer) which is directly connected to an image input apparatus, instead of using the scanner driver (see e.g. PTL (Patent Literature) 1).

In this case, the information processing apparatus which accesses the web page is not required to have a scanner driver installed therein.

Further, in recent years, a wide range of various uses of images have been made possible through image processing by so-called cloud computing, which is provided by a web service application operating on server apparatuses on the Internet.

As a method of transferring an image to a server apparatus on the Internet, the following technique is used: An image file is transferred from an information processing apparatus being in use to a desired server apparatus, using a menu option of e.g. image upload, which is integrated in a web page opened by a web browser application of the image processing apparatus. Image file transfer by a dedicated application for file transfer is also widely used.

CITATION LIST

Patent Literature

PTL 1: Japanese Patent Laid-Open Publication No. 2000-148649

SUMMARY OF INVENTION

Technical Problem

However, in an image input system using a web browser, disclosed in PTL1, a server apparatus connected to the image input apparatus, i.e. the aforementioned PC, is required to be provided within a local network so as to construct the image input system.

Further, to support a plurality of image input apparatuses, a server apparatus is required to have settings of scanner drivers and the like configured in advance such that the input apparatuses operate therewith.

Further, an information processing apparatus, such as a mobile terminal, cannot always secure a memory capacity sufficient to receive or store image data e.g. of a large number of pages. In this case, the whole image data scanned via a web page cannot be temporarily stored in the information processing apparatus, as described in PTL 1. Further, even if image data can be stored in a server apparatus, it is necessary to perform new operations different from scan processing, such as taking out of the image data and transfer of the same to a predetermined location, after the storage operation.

The present invention provides an arrangement for enabling a user to easily use an image input apparatus.

Solution to Problem

Accordingly, in a first aspect of the present invention, there is provided an server apparatus that is capable of communicating with an information processing apparatus, comprising a list providing unit configured to create a list of image input apparatuses found through a search by the information processing apparatus, and provide the list to the information processing apparatus, a script providing unit configured to provide script information including information for use in configuring settings of an operation of an image input apparatus selected on the information processing apparatus from the list provided by the list providing unit, to the information processing apparatus, a setting information-transmitting unit configured to transmit a job message to the information processing apparatus, for use in causing the image input apparatus to operate according to the operation settings configured at the information processing apparatus using the script information provided by the script providing unit, in order to cause the information processing apparatus to transfer the job message to the image input apparatus, and a storage unit configured to acquire image data input by the operation of the image input apparatus according to the job message via the information processing apparatus, and store the acquired image data.

Accordingly, in a second aspect of the present invention, there is provided an information processing apparatus that is capable of communicating with a server apparatus and an image input apparatus, comprising a selection screen display unit configured to acquire a list of image input apparatuses found through a search, from the server apparatus, and display a selection screen for prompting a user to select an image input apparatus to be operated from the list, a selection result-transmitting unit configured to transmit a selection result indicative of the image input apparatus selected by the user via the selection screen displayed by the selection screen display unit, to the server apparatus, setting screen display unit configured to acquire script information including information for use in configuring operation settings of the image input apparatus selected by the user, from the server apparatus, and display a setting screen for prompting the user to configure the operation settings, a setting message-transmitting unit configured to transmit a setting message indicative of the operation settings configured by the user via the setting screen displayed by the setting screen display unit, to the server apparatus, a first transfer unit configured to receive a job message from the server apparatus, for causing the image input apparatus to operate according to the operation settings indicated by the setting message, and transfer the received job message to the image input apparatus, and a second transfer unit configured to receive image data input by the operation of the image input apparatus according to the job message, from the image input apparatus, and transfer the received image data to the server apparatus.

Accordingly, in a third aspect of the present invention, there is provided a method of controlling a server apparatus that is capable of communicating with an information processing apparatus, comprising creating a list of image input apparatuses found through a search by the information processing apparatus, and providing the list to the information processing apparatus, providing script information including information for use in configuring settings of an operation of an image input apparatus selected on the information processing apparatus from the list, to the information processing apparatus, transmitting a job message to the information processing apparatus, for use in causing the image input apparatus to operate according to the operation settings configured at the information processing apparatus using the script information, in order to cause the information processing apparatus to transfer the job message to the image input apparatus, and a storage unit configured to acquire image data input by the operation of the image input apparatus according to the job message via the information processing apparatus, and store the acquired image data.

Accordingly, in a fourth aspect of the present invention, there is provided a method of controlling an information processing apparatus that is capable of communicating with a server apparatus and an image input apparatus, comprising acquiring a list of image input apparatuses found through a search, from the server apparatus, and displaying a selection screen for prompting a user to select an image input apparatus to be operated from the list, transmitting a selection result indicative of the image input apparatus selected by the user via the selection screen, to the server apparatus, acquiring script information including information for use in configuring operation settings of the image input apparatus selected by the user, from the server apparatus, and displaying a setting screen for prompting the user to configure the operation settings, transmitting a setting message indicative of the operation settings configured by the user via the setting screen displayed by the setting screen display unit, to the server apparatus, receiving a job message from the server apparatus, for causing the image input apparatus to operate according to the operation settings indicated by the setting message, and transferring the received job message to the image input apparatus, and receiving image data input by the operation of the image input apparatus according to the job message, from the image input apparatus, and transferring the received image data to the server apparatus.

Accordingly, in a fifth aspect of the present invention, there is provided a control program for causing a computer to execute the method of controlling the server apparatus.

Accordingly, in a sixth aspect of the present invention, there is provided a control program for causing a computer to execute the method of controlling the information processing apparatus.

Accordingly, in a seventh aspect of the present invention, there is provided a non-transitory computer-readable storage medium storing a control program for causing a computer to execute the method of controlling the server apparatus.

Accordingly, in an eighth aspect of the present invention, there is provided a non-transitory computer-readable storage medium storing a control program for causing a computer to execute the method of controlling an information processing apparatus.

Advantageous Effects of Invention

According to the present invention, it is possible to provide an arrangement for enabling a user to easily use an image input apparatus.

Further features of the present invention will become apparent from the following description of exemplary embodiments with reference to the attached drawings.

DESCRIPTION OF EMBODIMENTS

The present invention will now be described in detail below with reference to the accompanying drawings showing an embodiment thereof.

Figure 1:
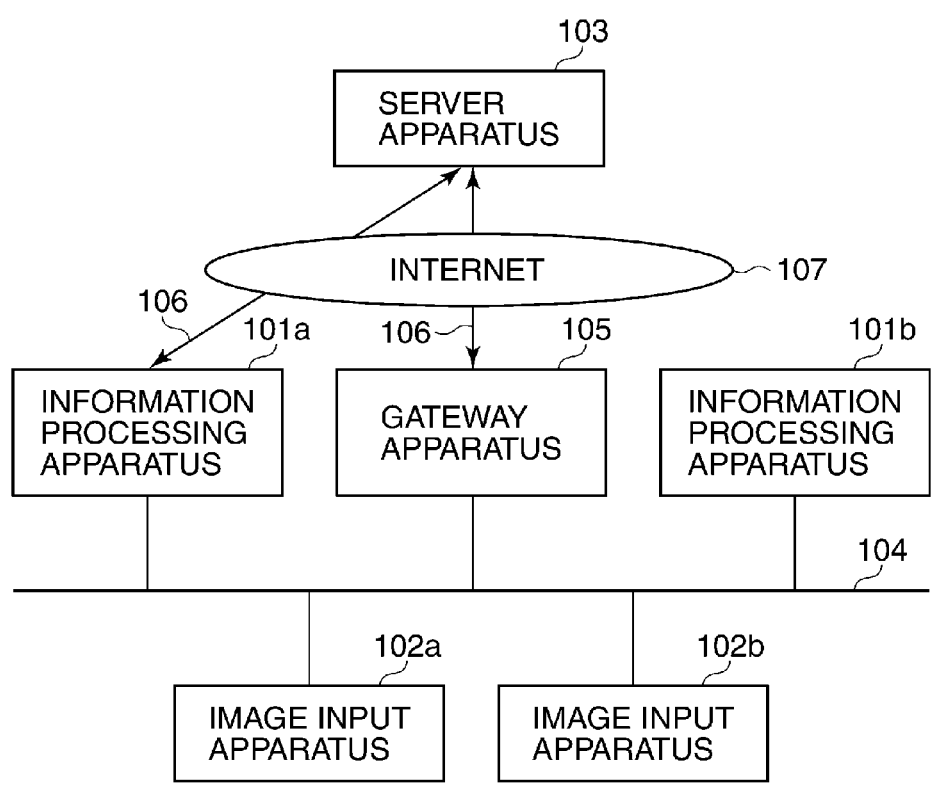
FIG. 1 is a schematic block diagram of an image processing system according to an embodiment of the present invention.

FIG. 1 is a schematic block diagram of an image processing system according to an embodiment of the present invention.

In FIG. 1, the image processing system includes information processing apparatuses 101a and 101b, image input apparatuses 102a and 102b, a gateway apparatus 105, and a server apparatus 103. In the following, in providing a description applicable to both of the information processing apparatuses 101a and 101b, the information processing apparatuses 101a and 101b are referred to as the information processing apparatuses 101. Similarly, in providing a description applicable to both of the image input apparatuses 102a and 102b, the image input apparatuses 102a and 102b are referred to as the image input apparatuses 102. Further, although the two information processing apparatuses 101 and the two image input apparatuses 102 are shown in FIG. 1, these are examples, and the numbers of them are not limited to two.

The information processing apparatuses 101 and the image input apparatuses 102 are connected via a local network 104 constructed by Ethernet (registered trademark), and hence can communicate with each other. Further, the server apparatus 103 is connected to the information processing apparatus 101a via a network 106 including a mobile communication network, public lines, the Internet 107 and the like, or via the gateway apparatus 105 and the network 106. Therefore, the server apparatus 103, the information processing apparatuses 101, and the image input apparatuses 102 can communicate with each other.

The image input apparatus 102 transmits image data to the information processing apparatus 101, and also performs scanning.

Figure 2:
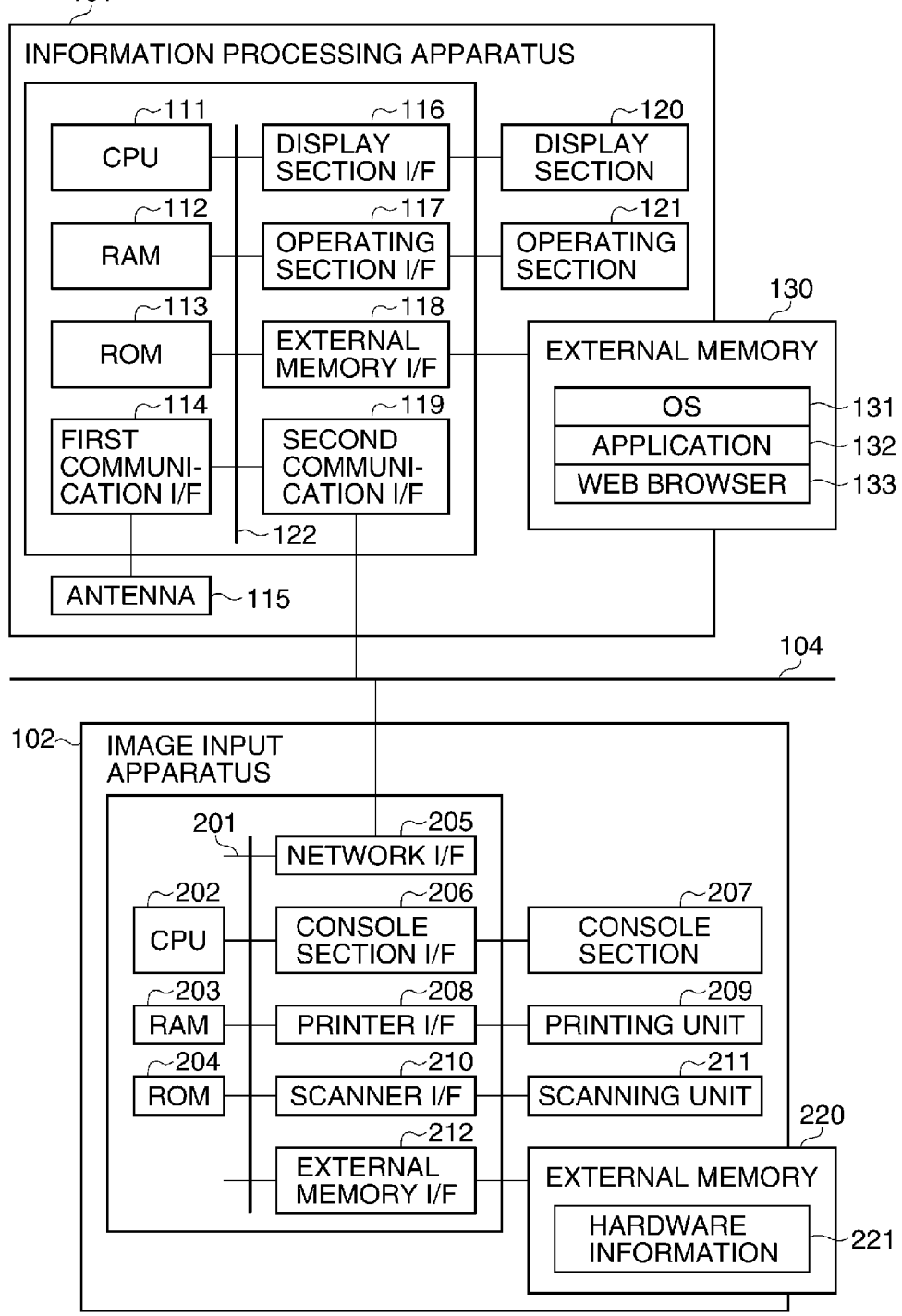
FIG. 2 is a block diagram of an information processing apparatus and an image input apparatus, appearing in FIG. 1.

FIG. 2 is a block diagram of the information processing apparatus 101 and the image input apparatus 102, appearing in FIG. 1.

In FIG. 2, a CPU 111 of the information processing apparatus 101 controls the overall operation of devices connected to a system bus 122 according to programs stored in a RAM 112. The RAM 112 further functions as a main memory, a work area, and so forth, for the CPU 111.

A ROM 113 stores various kinds of programs and data. An operating section interface 117 controls key inputs from an operating section 121 or a pointing device (e.g. a touch panel), not shown.

A display section interface 116 controls contents to be displayed on a display section 120. An external memory interface 118 controls access to an external memory 130, such as a flash memory or an SSD (solid state disk).

The external memory 130 functions as a storage medium in which the information processing apparatus can store data or from which the information processing apparatus can read data. More specifically, the external memory 130 stores an OS (operating system) 131, various kinds of applications 132, and a web browser 133.

A first communication interface 114 is a controller for communication e.g. via a mobile network, and establishes a network connection to a wireless base station via an antenna 115. A second communication interface 119 is a controller for a Wi-Fi wireless network and a preferred network, and enables connection to a local network via a Wi-Fi antenna or a network terminal, not shown.

Note that a script file which is executed on the web browser 133 is not initially stored in the external memory 130 of the information processing apparatus 101 which is newly used by a user. In the present embodiment, if a script file according to which the scan system environment is constructed is not stored, the web browser 133 running on the OS 131 downloads a script from the server apparatus 103 into the information processing apparatus 101 and executes the script using the RAM 112. Details of an example of script execution processing by the web browser 133 will be described with reference to FIG. 4.

Next, a description will be given of the configuration of the image input apparatus 102. A CPU 202 controls the overall operation of the image input apparatus 102. A RAM 203 functions as a main memory, a work area, and so forth, for the CPU 202, and is also used as an input information-loading area and an environment data-storing area. Further, the RAM 203 has a NVRAM (nonvolatile RAM) area, and is configured to be capable of expanding a memory capacity by an option RAM connected to an expansion port, not shown.

A ROM 204 stores various types of fonts, control programs and the like executed by the CPU 202, and various kinds of data. A network interface 205 transmits and receives data to and from the information processing apparatus 101.

A printer interface 208 controls interface with a printing unit 209 which is a printer engine. A scanner interface 210 controls interface with a scanning unit 211 which is a scanner engine.

An external memory 220 stores hardware information 221. An external memory interface 212 controls access to the external memory 220, and the external memory 220 includes a flash memory, an SSD, etc. Note that when the external memory 220 is not connected, the image input apparatus 102 stores information etc. used in the information processing apparatus 101, in the ROM 204.

An console section interface 206 controls interface with a console section 207 from which the scan processing to be performed by the image input apparatus 102 is set. The console section 207 is provided with an operating panel for receiving input operations by a user. Switches, an LED display device, etc. for the input operations are arranged on the operating panel. Further, the console section 207 may include an NVRAM, not shown, to store scan setting information input from the operating panel. The above-mentioned sections are connected by a system bus 201.

With the above-described configuration, the CPU 202 acquires image data from the scanning unit 211 via the scanner interface 210 based on the control program and the like stored in the ROM 204. Further, the CPU 202 is capable of performing processing for communicating with the information processing apparatus 101 via the network interface 205. The CPU 202 is configured to be capable of transmitting image data to the information processing apparatus 101, and notifying the information processing apparatus 101 of information and the like stored in the image input apparatus 102. In the present embodiment, the network interface 205 implements a corresponding web service protocol or a protocol for its own search and scanning.

Figure 3:
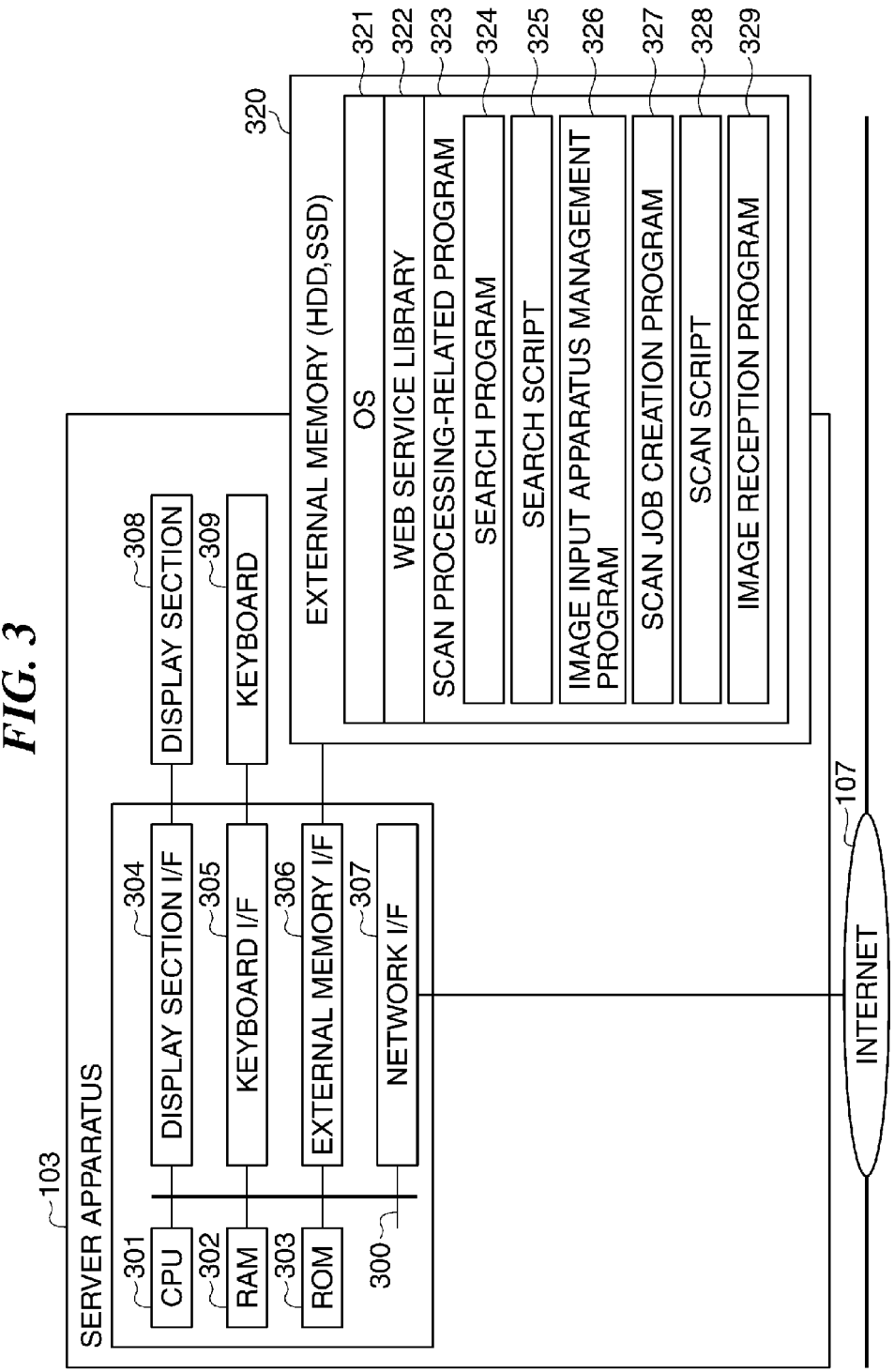
FIG. 3 is a block diagram of a server apparatus appearing in FIG. 1.

FIG. 3 is a schematic block diagram of the server apparatus 103 appearing in FIG. 1.

In FIG. 3, a CPU 301 controls the overall operation of devices connected to a system bus 300 according to programs stored in a RAM 302. The RAM 302 further functions as a main memory and a work area and the like, for the CPU 301. A ROM 303 stores various kinds of programs and data. A keyboard interface 305 controls key inputs from a keyboard 309 or a pointing device, such as a mouse, not shown.

A display section interface 304 controls contents to be displayed on a display section 308. An external memory interface 306 controls access to an external memory 320, such as a hard disk (HD) or an SSD.

The external memory 320 stores an OS 321, a web service library 322, and various kinds of scan processing-related programs 323, and further stores user files, edited files, and so on, not shown.

Of the above-mentioned stored programs and files, the scan processing-related programs 323 include a search program 324, a search script 325, an image input apparatus management program 326, a scan job creation program 327, a scan script 328, and an image reception program 329.

A network interface 307 is connected to the information processing apparatus 101 via the Internet 107 or the mobile communication network, and indirectly performs communication control processing with the image input apparatus 102 connected to the information processing apparatus 101.

Figure 4:
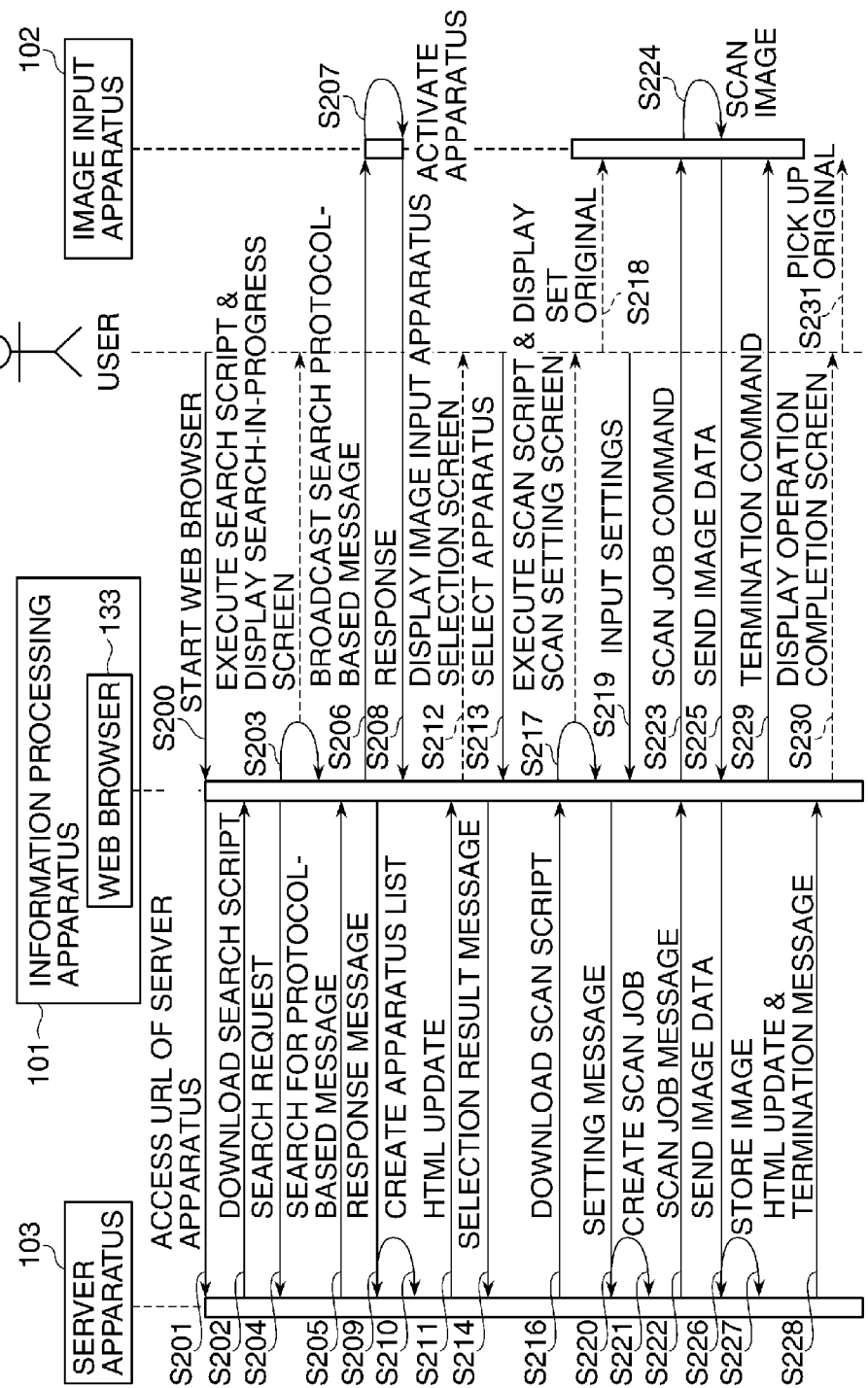
FIG. 4 is a sequence diagram of a scanning process executed by the server apparatus, the information processing apparatus, and the image input apparatus, appearing in FIG. 1.

FIG. 4 is a sequence diagram of a scanning process, including the script execution processing by the web browser 133 of the information processing apparatus 101, which is executed by the server apparatus 103, the information processing apparatus 101, and the image input apparatus 102, appearing in FIG. 1.

In FIG. 4, it is assumed the information processing apparatus 101 is capable of accessing the image input apparatus 102 via the local network 104. Further, the web browser 133 of the information processing apparatus 101 is capable of accessing the server apparatus 103 in a state started up using the RAM 112.

The user starts the web browser 133 using the operating section 121 of the information processing apparatus 101 (step S200). Next, the information processing apparatus 101 accesses the URL of the server apparatus 103 to thereby log into the server apparatus 103 so as to make use of a scan processing service (step S201).

Figure 5:
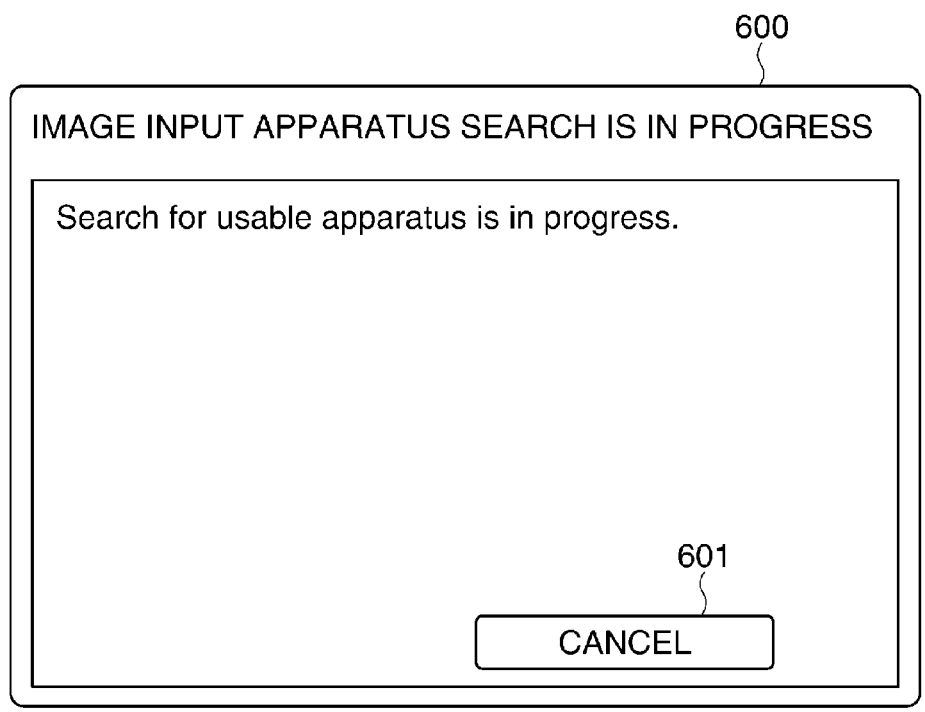
FIG. 5 is a view showing an example of a search-in-progress screen.

When the login is successful, a search script for searching for image input apparatuses is downloaded from the server apparatus 103 to the web browser 133 (step S202). The downloaded search script is executed on the web browser 133, and the information processing apparatus 101 displays a search-in-progress screen (step S203). FIG. 5 is a view showing an example of the search-in-progress screen. Details of the search-in-progress screen in FIG. 5 will be described hereinafter.

When the search script execution is successful, the information processing apparatus 101 sends a search request to the server apparatus 103 (step S204). Note that although not shown, the information processing apparatus 101 periodically transmits an update request message requesting to the server apparatus 103 during execution of the search script so as to request the same to update an HTML file. By transmitting the update message, if there is a change in the status of the server apparatus 103, the information processing apparatus 101 updates the displayed screen according to the update of the HTML file.

Upon receipt of the search request by the server apparatus 103, a search message is transmitted from the search program 324 of the server apparatus 103 to the information processing apparatus 101 (step S205). In response to this, the search script executed on the web browser 133 of the information processing apparatus 101 sends the search message by broadcast to the local network 104 after executing IP header conversion of packet data of the received search message (step S206). An example of the packet data conversion process executed by the search script will be described hereinafter.

Each image input apparatus 102 having received the broadcast search protocol-based message is activated (returns from the sleep state) (step S207). The image input apparatus 102 determines whether or not the self apparatus is compatible with the search protocol-based message. When it is determined that the image input apparatus 102 is compatible with the search protocol-based message, the image input apparatus 102 sends a response to the information processing apparatus 101 as a broadcast transmission source (step S208). Thus, image input apparatuses 102 on the local network 104 which are compatible with the search protocol-based message each transmit the response to the information processing apparatus 101.

The search script being executed on the web browser 133 of the information processing apparatus 101 having received responses converts the received responses to response messages, and sequentially transfers the response messages to the server apparatus 103 (step S209). An example of converting processing executed by the search script for converting a response to a response message will be described hereinafter.

Next, the image input apparatus management program 326 analyzes response messages transmitted from the information processing apparatuses 101 to the server apparatus 103. Then, the image input apparatus management program 326 creates an image input apparatus list as a list of the retrieved image input apparatuses 102 obtained from the search result (step S210).

Figure 6:
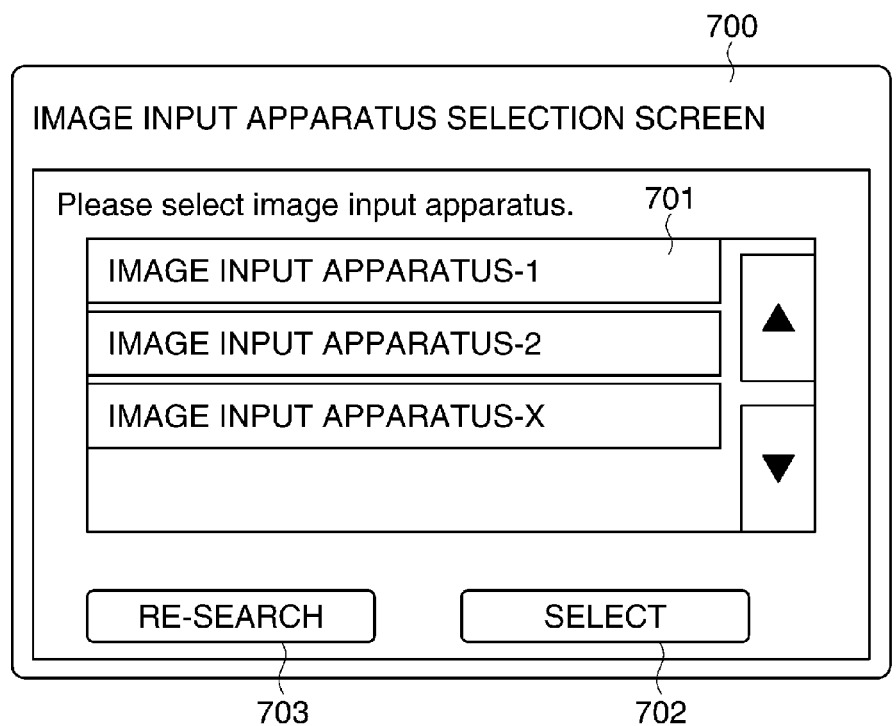
FIG. 6 is a view showing an example of an image input apparatus selection screen.

The image input apparatus management program 326 converts the result (list) to an HTML file, and performs the HTML update (step S211) to thereby display an image input apparatus selection screen including the list of the image input apparatuses on the web browser 133 (step S212). FIG. 6 is a view showing an example of the image input apparatus selection screen. Details of the image input apparatus selection screen shown in FIG. 6 will be described hereinafter.

The user selects the image input apparatus 102 to be used from the apparatus list (step S213), and the web browser 133 transmits the selection result to the server apparatus 103 as an apparatus selection message (step S214).

Figure 7:
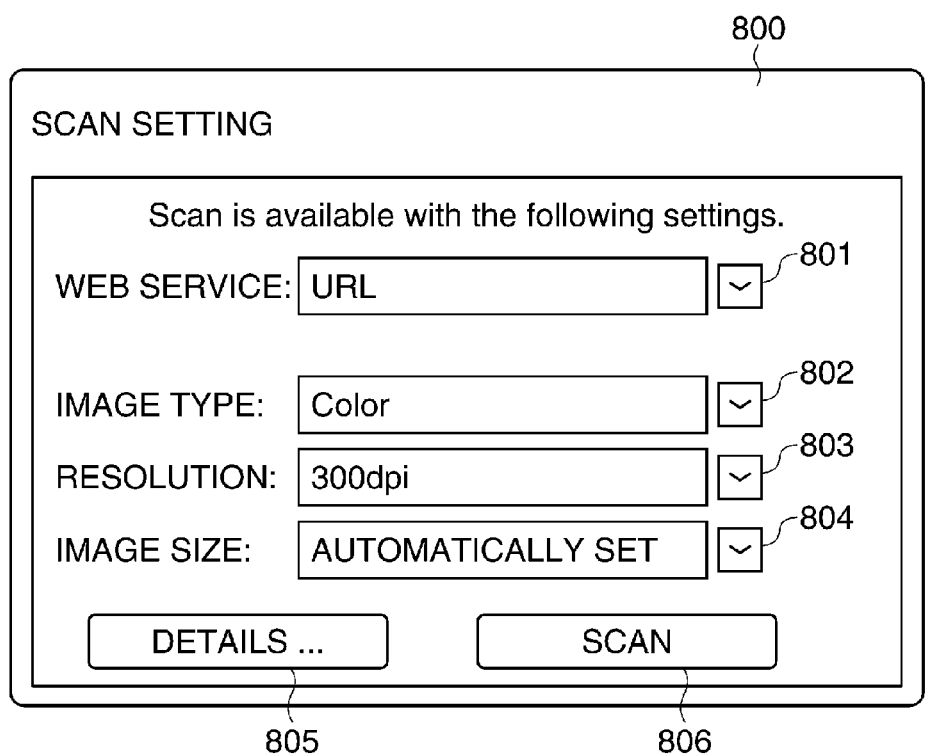
FIG. 7 is a view showing an example of a scan setting screen.

The image input apparatus management program 326 selects a scan script compatible with the selected image input apparatus 102, and downloads the selected scan script to the web browser 133 (step S215). The downloaded scan script is executed on the web browser 133, and a scan setting screen is displayed (step S217). FIG. 7 is a view showing an example of the scan setting screen. Details of the scan setting screen shown in FIG. 7 will be described hereinafter.

The user sets an original on the image input apparatus 102 selected from the scan setting screen (step S218), and inputs settings for scanning (step S219). Note that although not shown, during execution of the scan script, the information processing apparatus 101 periodically transmits an HTML file update request message to the server apparatus 103 so as to request the same to update the HTML file. By transmitting the update request message, if there is a change in the status of the server apparatus 103, the information processing apparatus 101 updates the displayed screen according to the update of the HTML file.

The scan script transmits the settings set by the user to the server apparatus 103 as a scan setting message (step S220). The scan job creation program 327 of the server apparatus 103 generates a scan job according to the received setting message (step S221), and transmits the scan job to the information processing apparatus 101 as a scan job message (step S222).

Figure 8:
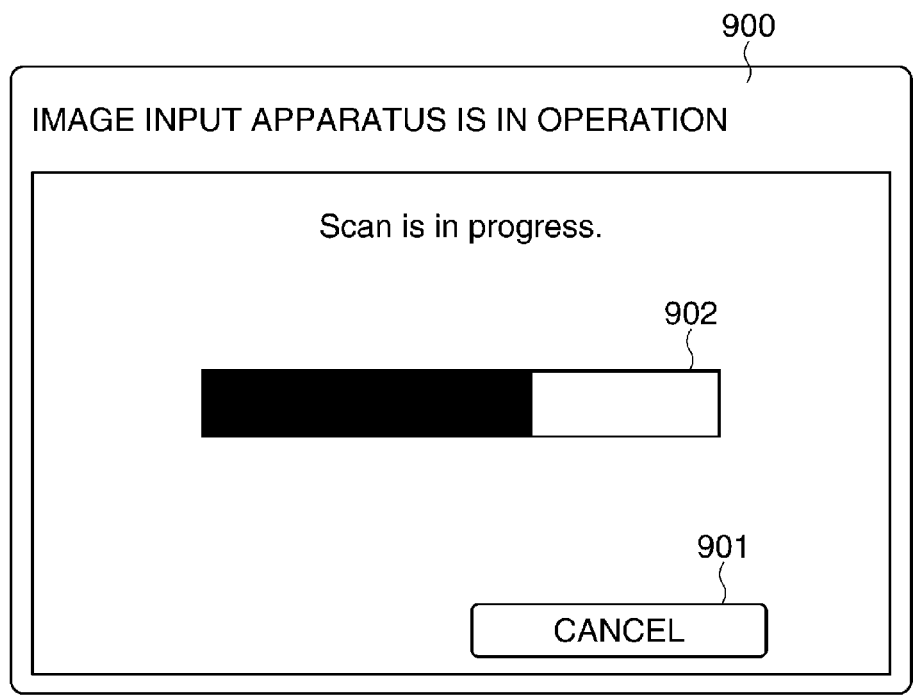
FIG. 8 is a view showing an example of a scan-in-progress screen.

The information processing apparatus 101 having received the scan job message transmits the scan job message to the image input apparatus 102 as a scan job command by the scan script (step S223). During execution of the steps S223 to step S229, described hereinafter, a scan-in-progress screen is displayed. FIG. 8 is a view showing an example of the scan-in-progress screen. Details of the scan-in-progress screen shown in FIG. 8 will be described hereinafter.

According to the scan job command, the image input apparatus 102 executes a scan operation (step S224). Then, the image input apparatus 102 transmits image data obtained by the scan operation to the information processing apparatus 101 (step S225). The image data is different in type depending on a transmission method used by the image input apparatus 102.

The scan script executed on the information processing apparatus 101 performs, similarly to the search script, processing for transmitting the image data to the server apparatus 103 without modifying the contents of the image data by performing IP header conversion and the like of packet data (step S226).

The server apparatus 103 has determined the image input apparatus in advance, and hence the server apparatus 103 can perform proper image conversion processing by the image reception program 329 according to the type of image data. These image processing and image storage processing are executed by the image reception program 329 of the server apparatus 103 (step S227).

Figure 9:
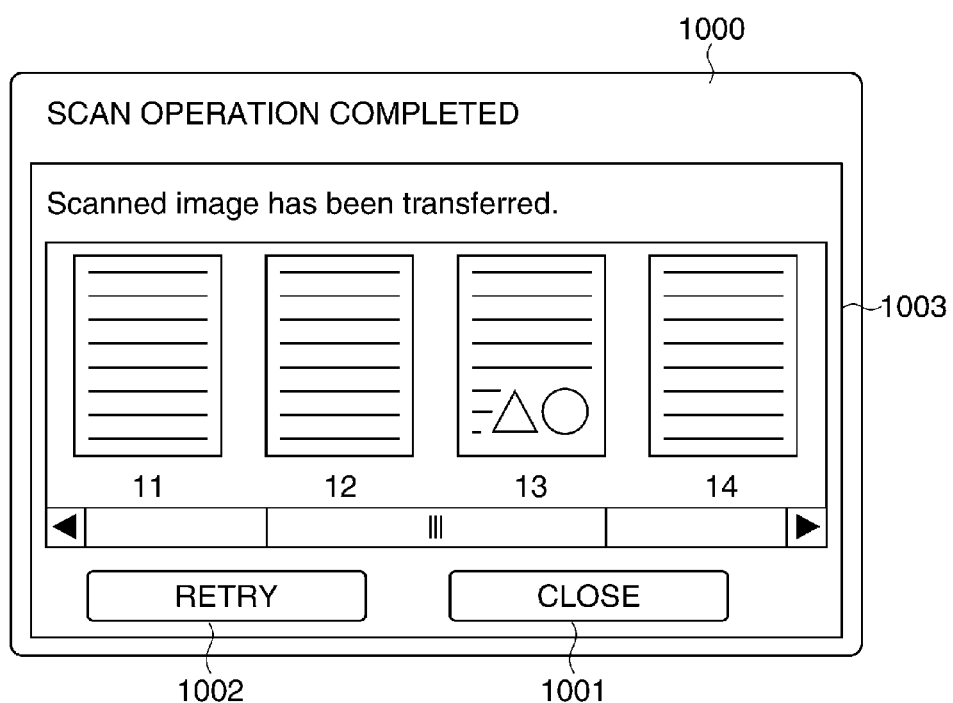
FIG. 9 is a view showing an example of a scan operation completed screen.

When the image storage processing is terminated, the server apparatus 103 transmits the updated HTML file and a termination message to the information processing apparatus 101 (S228). Upon receipt of the HTML file update and the termination message, the information processing apparatus 101 displays a scan operation completed screen (step S230). FIG. 9 is a view showing an example of the scan operation completed screen. Details of the scan operation completed screen shown in FIG. 9 will be described hereinafter.

Then, the scan script converts the received termination message to a termination command, and transmits the termination command to the image input apparatus 102 (step S229). The user goes and picks up the original on which the operation has been completed, from the image input apparatus 102 (step S231).

According to the above scan processing sequence, the image data obtained by scanning the original is transferred to the server apparatus 103.

The screens in FIGS. 5 to 9 referred to in the above description will be described in detail.

The search-in-progress screen, denoted by reference numeral 600, shown in FIG. 5, is a screen displaying the HTML file which has been updated by the server apparatus 103, in a state in which the search script is being executed in the step S203. If a cancel button 601 is depressed by the user, the search script sends a cancel message to the server apparatus 103, whereby the search process is aborted.

The example of the image input apparatus selection screen, denoted by reference numeral 700 in FIG. 6, is a screen which the web browser 133 displays based on the HTML file updated by the image input apparatus management program 326 of the server apparatus 103 in the step S211 (image input apparatus selection screen HTML file).

In an image input apparatus list display section 701, when the user depresses a selection button 702, the search script sends a selection result message to the server apparatus 103. The server apparatus 103 prepares the scan script 328 compatible with the selected image input apparatus 102.

When the user depresses a re-search button 703, a search request is sent to the server apparatus 103 as a message again, and the steps S205 to S212 are executed again. As a result, the contents of the image input apparatus list display section 701 are updated.

The scan setting screen, denoted by reference numeral 800 in FIG. 7, is a screen for enabling the user to select settings of the scan processing.

On the scan setting screen 800, there are displayed a web service selection drop-down combo box 801 for selecting a web service, and an image type drop-down combo box 802, a resolution drop-down combo box 803, and an image size drop-down combo box 804, which are for configuring settings of the scanning operation. Also displayed on the scan setting screen 800 are a detail button 805 and a scan button 806.

When the user depresses the scan button 806, the scan script 328 transmits the settings configured from the buttons 801 to 804 at the time to the server apparatus 103 as a setting message.

The detail button 805 is a button which is depressed by the user, for making more detailed settings. Although not shown in detail, when the detail button 805 is depressed, the scan script 328 updates the HTML file of the "scan setting" screen, whereby the user is prompted to make additional settings. When the additional settings are made, and a button, not shown, for storing the settings is depressed, the display returns to the scan setting screen 800.

The scan-in-progress screen, denoted by reference numeral 900 in FIG. 8, will be described. The scan-in-progress screen is a screen displayed after the scan button 806 is depressed on the scan setting screen 800 shown in FIG. 7. As shown in FIG. 8, the status is also displayed by a scan processing progress indicator 902.

The scan processing progress indicator 902 is displayed by the scan script 328 downloaded and executed on the web browser 133 when after starting the scan operation by the image input apparatus 102, the scanning process has reached the step S224.

A cancel button 901 is used for canceling the scan processing being executed by being depressed by the user. When the cancel button 901 is depressed, the scan script transmits a cancel message to the server apparatus 103.

The server apparatus 103 transmits a scan job message including the cancellation to the information processing apparatus 101 similarly to the step S222, whereby a sequence of cancel job commands are transmitted to the image input apparatus 102 similarly to the step S223. The scan script updates the scan-in-progress screen 900 when transmitting image data in the step S226, whereby the scan processing progress indicator 902 displays the status of image data transmission to the user.

The scan operation completed screen, denoted by reference numeral 1000 in FIG. 9, will be described. When image data reception is completed in the image storage processing, the image reception program 329 creates an HTML file including reduced images which can be displayed on the information processing apparatus 101 from the image data. Then, the HTML file is transmitted to the web browser 133, whereby the scan operation completed screen 1000 is displayed to notify the user of the operation completion.

A reduced image display area 1003 is displayed on the scan operation completed screen 1000 to notify the user of the contents of the final scanned image. When the user depresses a close button 1001, the scan operation completed screen 1000 is closed, whereby the scan script 328 downloaded and executed by the web browser 133 is terminated. When the user depresses a retry button 1002, the process returns to the step S217, wherein the scan setting screen 800 shown in FIG. 7 is displayed.

Figure 10A:
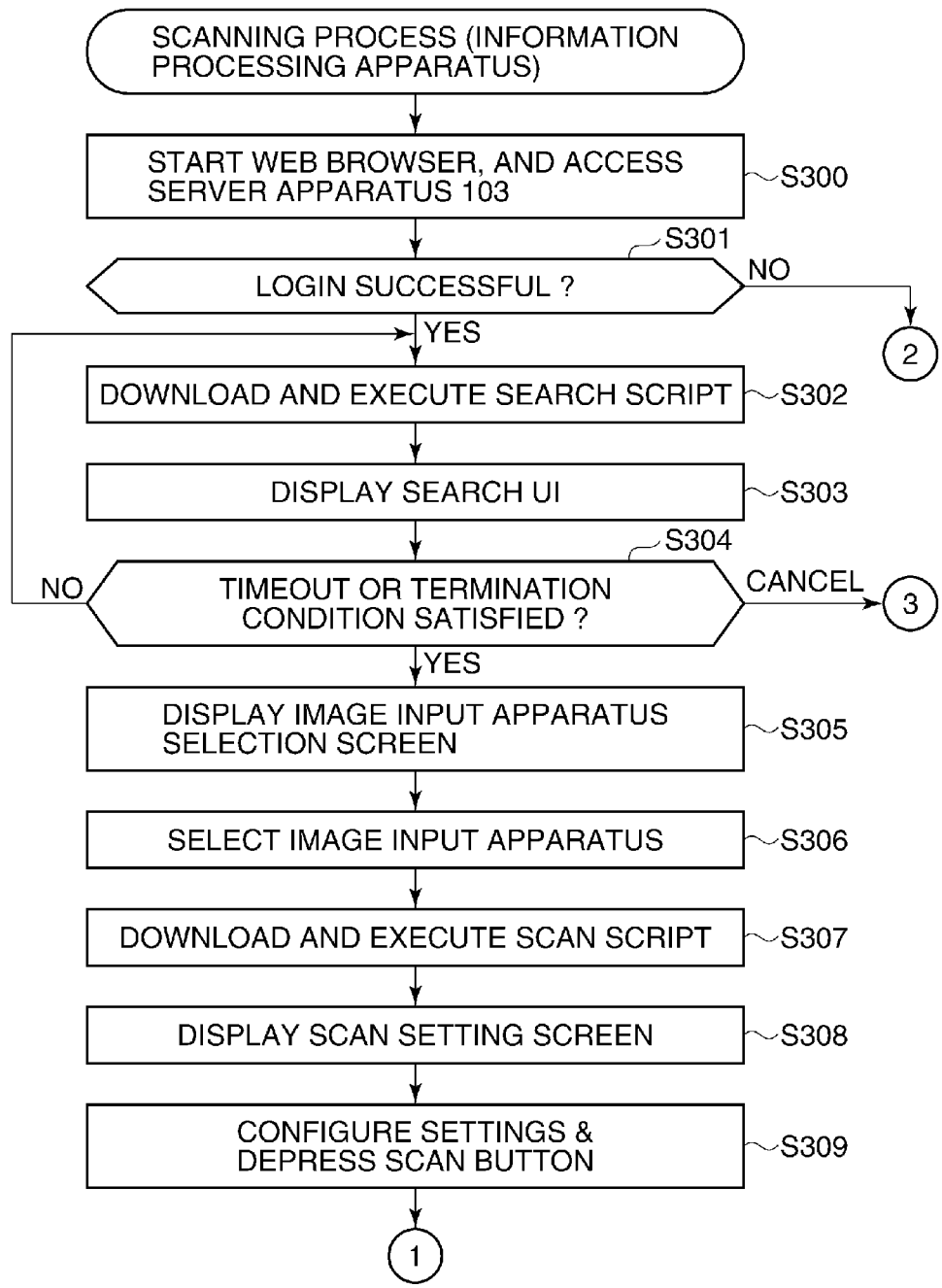
FIGS. 10A and 10B are a flowchart of a scanning process executed by the information processing apparatus appearing in FIG. 1.
Figure 10B:
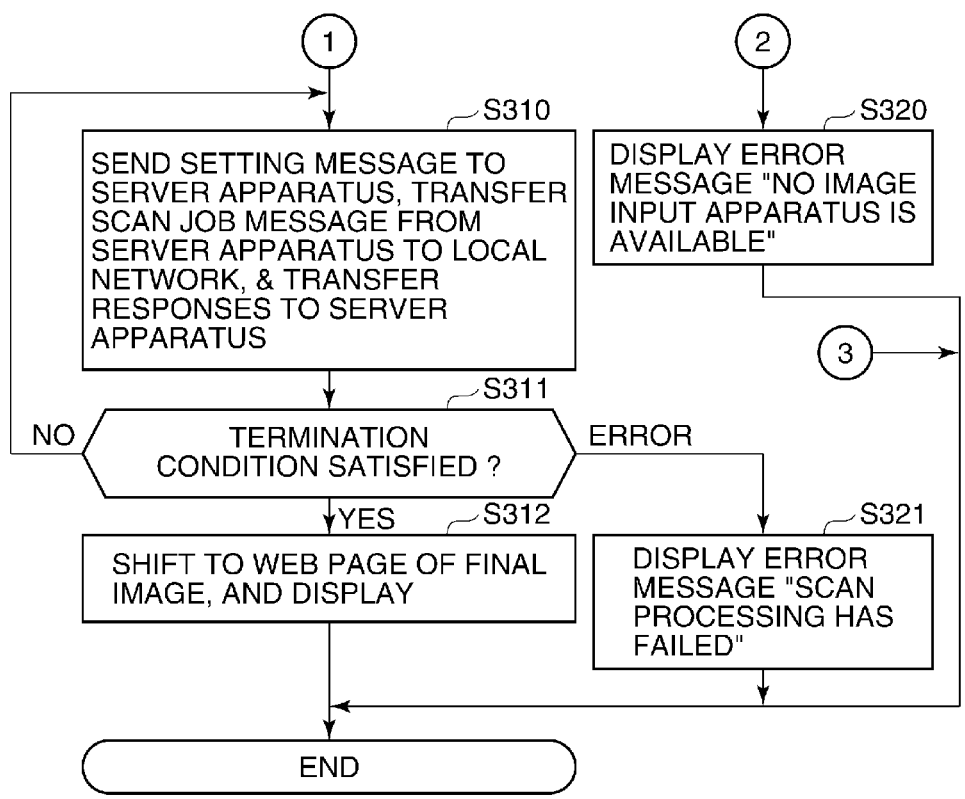

FIGS. 10A and 10B are a flowchart of a scanning process executed by the information processing apparatus 101 appearing in FIG. 1.

In FIGS. 10A and 10B, the information processing apparatus 101 starts the web browser 133 by the OS 131, and accesses the URL of the server apparatus 103 (step S300). The information processing apparatus 101 logs into a web page hosted by the web service library 322 of the server apparatus 103, and determines whether or not the login is successful (step S301).

If the login is not successful (NO to the step S301), the web browser 133 displays an error message of "No image input apparatus is available." (step S320), followed by terminating the present process.

If the login is successful (YES to the step S301), the web browser 133 downloads the search script 325 from the server apparatus 103 via the Internet 107, and executes the downloaded search script 325 (step S302).

When the search script 325 is executed, a search request message is sent to the server apparatus 103, and then the search script 325 receives a search protocol-based message as a response to the search request. Then, the search script 325 converts the IP header of each network packet of the search protocol-based message to thereby transmit the search protocol-based message to the local network by broadcast. The search script 325 transfers each of responses sent back from the image input apparatuses 102a and 102b and the like in response to the search protocol-based message sent thereto by broadcast, to the server apparatus 103 as a response message after converting the IP header of the network packets of the response. Further, at this time, polling processing for receiving responses to the search protocol-based message from the server apparatus 103 is being performed.

During execution of the above-mentioned search script, the web browser 133 displays the search-in-progress screen shown in FIG. 5 (step S303). Next, it is determined whether or not session time-out occurs or a termination condition is satisfied (step S304). The "time-out" means that a predetermined time period set for polling processing has expired. Further, the termination condition is that the HTML file is updated by the server apparatus 103.

If neither session time-out occurs nor satisfaction of the termination condition occurs (NO to the step S304), the process returns to the step S302. At this time, if the processing is canceled by the user, the process proceeds to the step S320.

If session time-out occurs or the termination condition is satisfied (YES to the step S304), the update of the HTML file is performed by the server apparatus 103, and the web browser 133 displays the image input apparatus selection screen shown in FIG. 6 (step S305). The step S303 corresponds to an operation of a selection screen display unit that displays a selection screen for prompting the user to select an image input apparatus to be operated, from a list of image input apparatuses found through a search by a server apparatus.

When the user selects the image input apparatus to be used from the apparatus list (step S306), the server apparatus 103 is notified of a selection result message. The step S306 corresponds to an operation of a selection result transmission unit that transmits a selection result indicative of an image input apparatus selected by the user. Next, the scan script 328 compatible with the selected image input apparatus 102 is downloaded from the server apparatus 103, and is executed by the web browser 133 (step S307).

The executed scan script displays the scan setting screen shown in FIG. 7 (step S308). In the step S307, script information including information for use in configuring operation settings of the image input apparatus 102 selected by the user is acquired from the server apparatus 103. The step S308 corresponds to an operation of a setting screen display unit that displays a setting screen for prompting a user to set the operation settings.

The user is prompted to depress the scan button 806 for starting the scan setting and the scan processing. When the user depresses the scan button 806 (step S309), the scan script transmits a scan setting message to the server apparatus 103. Next, the scan script transfers a scan job message transmitted from the server apparatus 103 to the local network to transmit the scan job message to the selected image input apparatus 102. The scan script transfers a response sent back from the image input apparatus 102 to the information processing apparatus 101 to the server apparatus 103. This processing sequence (step S310) is repeated.

By repeating the processing sequence, the scanned image data included in the response is transmitted to the server apparatus 103. The step S310 corresponds to an operation of a setting message-transmitting unit that transmits a setting message indicative of operation settings configured by a user.

Further, the step S310 corresponds to an operation of a first transfer unit that receives a job message for use in causing the image input apparatus to operate according to the operation settings indicated by the setting message from the server apparatus, and transfers the received job message to the image input apparatus.

Furthermore, the step S311 corresponds to an operation of a second transfer unit that receives image data input by the image input apparatus through an operation thereof according to the job message, from the image input apparatus, and transfers the received image data to the server apparatus.

The repetition of the processing sequence is terminated when the termination condition is satisfied (YES to the step S311), and the process proceeds to a step S312. Note that the termination condition in this step is that the image storage processing by the server apparatus 103 for receiving the responses is completed. If an error, such as a time-out error, occurs in the above-mentioned processing sequence, an HTML file indicative of an error message of "Scan processing has failed." is received and displayed (step S321), followed by terminating the present process.

If the termination condition is satisfied (YES to the step S311), the scan operation completed screen shown in FIG. 9 is displayed by shifting to a web page of the final image (step S312), followed by terminating the present process. More specifically, in the step S312, after the transfer of the image data is completed, the information processing apparatus 101 receives the termination message including reduced images obtained by reducing the image data from the server apparatus 103, and displays the contents indicating the completion of the operation of the image input apparatus 102 and the reduced image.

According to the process in FIGS. 10A and 10B, the information processing apparatus 101 instructs the server apparatus 103 to search for the image input apparatuses 102. Next, the information processing apparatus 101 displays a selection screen for prompting the user to select the image input apparatus 102 to be operated, by displaying a list of the image input apparatuses 102 found through the search by the server apparatus 103. Then, the information processing apparatus 101 transmits a selection result indicative of the image input apparatus 102 selected by the user, and acquires script information from the server apparatus 103, which includes information for use in setting details of an operation of the image input apparatus 102 selected by the user. By acquisition of the script information, the information processing apparatus 101 displays the setting screen for prompting the user to configure the operation settings. Then, the information processing apparatus 101 transmits a setting message indicative of the operation settings configured by the user, and receives a job message from the server apparatus 103, for use in causing the image input apparatus 102 to operate according to the operation settings indicated by the setting message. The information processing apparatus 101 transfers the received job message to the image input apparatus 102. The information processing apparatus 101 receives image data from the image input apparatus 102, which has been input by the operation of the image input apparatus 102 according to the job message. The information processing apparatus 101 transfers the thus obtained image data to the server apparatus 103, and hence it is possible to provide an information processing apparatus for enabling a user to easily use an image input apparatus.

Figure 11A:
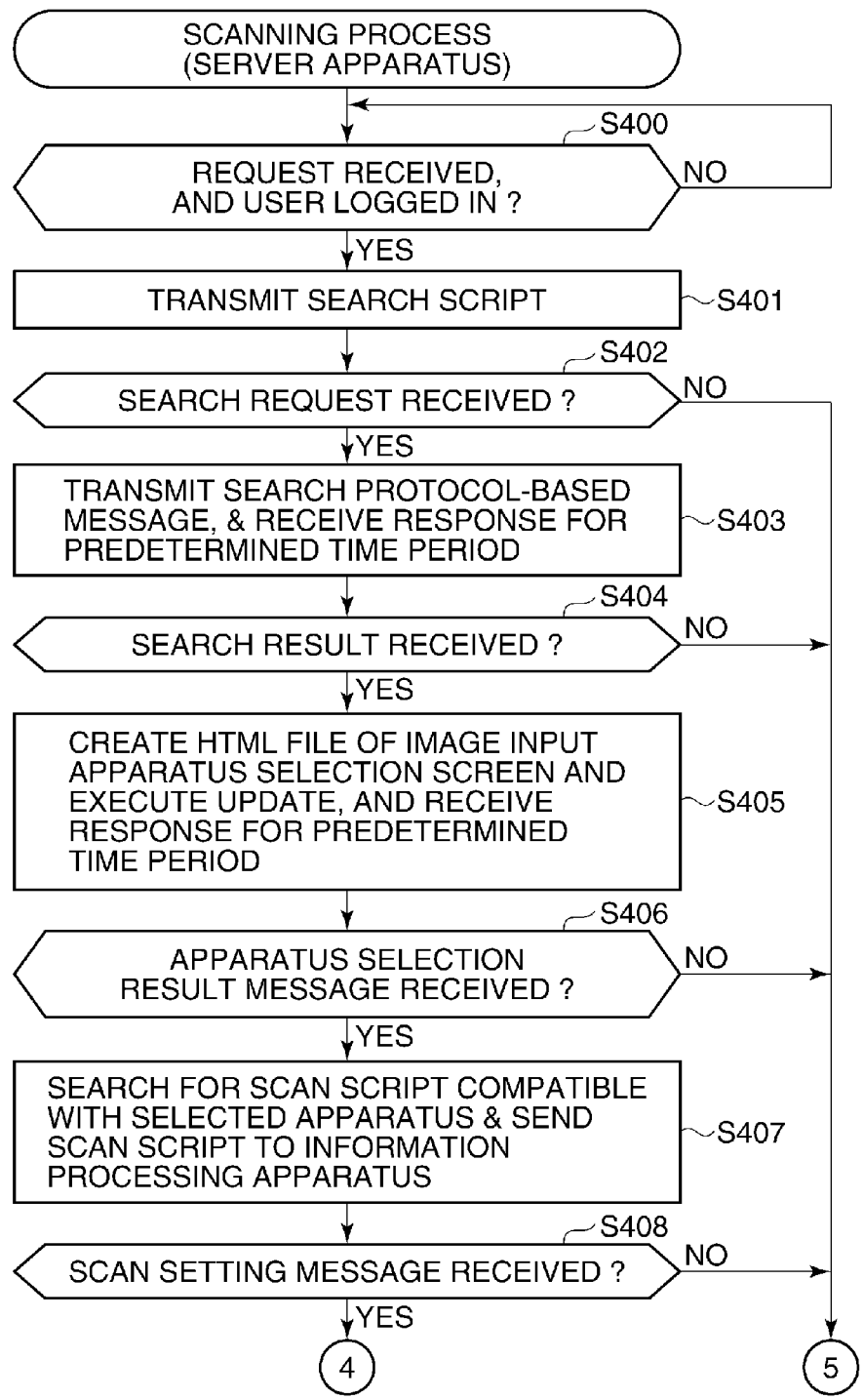
FIGS. 11A and 11B are a flowchart of a scanning process executed by the server apparatus appearing in FIG. 1.
Figure 11B:
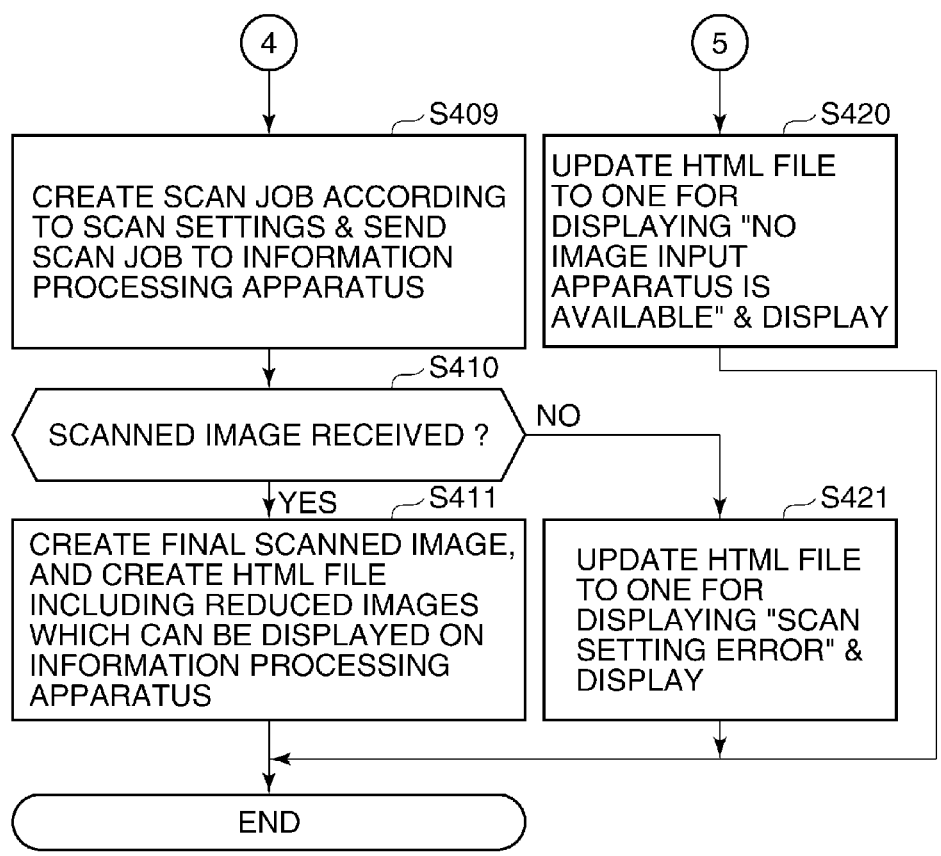

FIGS. 11A and 11B are a flowchart of a scanning process executed by the server apparatus 103 appearing in FIG. 1.

In FIGS. 11A and 11B, when the server apparatus 103 receives a request message from the information processing apparatus 101, and the user logs into the server apparatus 103 (YES to a step S400), the search program 324 transmits the search script 325 (step S401).

Subsequently, it is determined whether or not a search request by a search request message has been received from the information processing apparatus 101 within a predetermined time period (step S402). If no search request has been received within the predetermined time period (NO to the step S402), the search program 324 updates the HTML file to one for displaying a message "No image input apparatus is available." which implies that an environment for scan processing cannot be created, and causes the web browser 133 to display the message (step S420), followed by terminating the present process.

On the other hand, if a search request has been received within the predetermined time period (YES to the step S402), the search program 324 sends a search protocol-based message to the information processing apparatus 101, and waits and receives to analyze responses for a predetermined time period (step S403).

Then, it is determined whether or not a search result has been received within a predetermined time period (step S404). If it is determined in the step S404 that no search result has been received (NO to the step S404), the process proceeds to the step S420.

On the other hand, if it is determined in the step S404 that a search result has been received (YES to the step S404), the image input apparatus management program 326 creates an HTML file for showing the image input apparatus selection screen. The server apparatus 103 causes the web browser 133 to display the image input apparatus selection screen, and waits and receives a response for a predetermined time period (step S405). The step S405 corresponds to an operation of a list providing unit that provides a list of image input apparatuses found through a search to the information processing apparatus 101.

Then, it is determined whether or not an apparatus selection result message has been received within a predetermined time period (step S406). If it is determined in the step S406 that no apparatus selection result message has been received (NO to the step S406), the process proceeds to the step S420.

On the other hand, if an apparatus selection result message has been received (YES to the step S406), the image input management program 326 searches for a scan script 328 compatible with the selected image input apparatus 102, and transmits the scan script found through the search to the information processing apparatus 101 (step S407). The step S407 corresponds to an operation of a script providing unit that provides script information including information for use in configuring operation settings of the image input apparatus selected by the information processing apparatus from the provided list, to the information processing apparatus 101.

Next, it is determined whether or not a scan setting message has been received within a predetermined time period (step S408). If it is determined in the step S408 that no scan setting message has been received (NO to the step S408), the process proceeds to the step S420.

On the other hand, if a scan setting message has been received (YES to the step S408), the scan job creation program 327 creates a scan job according to the received scan setting message, and transmits the created scan job to the information processing apparatus 101 (step S409). The step S409 corresponds to an operation of a setting information-transmitting unit that transmits a job message to the information processing apparatus, for use in causing the image input apparatus to operate according to the operation settings configured at the information processing apparatus, in order to cause the information processing apparatus to transfer the job message to the image input apparatus.

Next, the server apparatus 103 starts the image reception program 329, and determines whether or not a scanned image has been received within a predetermined time period (step S410). If it is determined in the step S410 that no scanned image has been received (NO to the step S410), the image reception program 329 updates an HTML file indicative of a message of "scan setting error". Then, the image reception program 329 causes the web browser 133 to display the message (step S421), followed by terminating the present process. In this step, the image reception program 329 creates the HTML file indicative of a message of "scan setting error" by making use of the scan script performing periodical transmission of the HTML file update request message to the server apparatus 103. The message of "scan setting error" includes a message to the effect that a scan execution processing environment cannot be created.

If it is determined in the step S410 that a scanned image has been received (YES to the step S410), the image reception program 329 creates a final scanned image. The image reception program 329 further creates an HTML file including reduced images which can be displayed on the image processing apparatus 101. Then, the image reception program 329 transmits the HTML file as a final image data transmission response message to the information processing apparatus 101 (step S411), followed by terminating the present process. In the step S410, as shown in FIG. 4, the image data storage processing is also performed. Therefore, the step S410 corresponds to an operation of a storage unit that acquires image data via the information processing apparatus, which has been input by the operation of the image input apparatus according to a job message, and stores the acquired image data. Further, in the step S410, when the image data storage is completed, a termination message including reduced images obtained by reducing image data is transmitted to the information processing apparatus 101.

By receiving the termination message, the web browser 133 is caused to display a screen for notifying the user of the scan operation completion and the contents of the final image data, as shown in FIG. 9.

According to the process in FIG. 11, the server apparatus 103 searches for image input apparatuses according to an instruction from the information processing apparatus 101. Then, the server apparatus 103 provides a list of the image input apparatuses 102 found through the search to the information processing apparatus 101. The server apparatus 103 provides script information to the information processing apparatus 101, which includes information for use in configuring operation settings of the image input apparatus 102 selected by the information processing apparatus 101 from the provided list. The server apparatus 103 transmits a job message to the information processing apparatus 101, for use in causing the image input apparatus 102 to operate according to the operation settings configured at the information processing apparatus 101 using the provided script information, in order to cause the information processing apparatus 101 to transfer the job message to the image input apparatus 102. The server apparatus 103 acquires image data via the information processing apparatus 101, which has been input by the operation of the image input apparatus 102 according to the job message. The thus obtained image data is stored, and hence it is possible to provide a server apparatus for enabling a user to easily use an image input apparatus.

Figure 12:
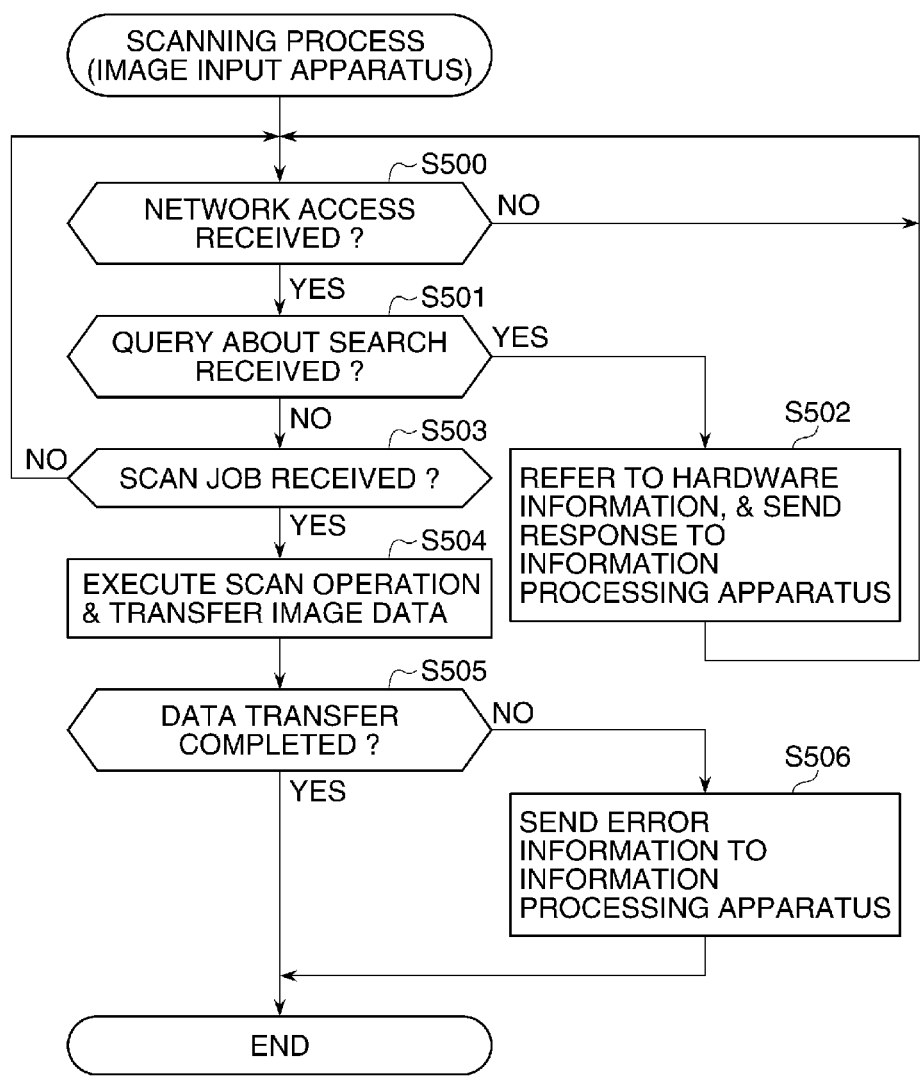
FIG. 12 is a flowchart of a scanning process executed by the image input apparatus appearing in FIG. 1.

FIG. 12 is a flowchart of a scanning process executed by the image input apparatus 102 appearing in FIG. 1.

In FIG. 12, the image input apparatus 102 waits for access to the network interface 205 from the outside via the local network 104. When the image input apparatus 102 receives a network access in this state (YES to a step S500), the image input apparatus 102 is activated (returns from the sleep state), and it is determined whether or not a query about the search by a search command is received (step S501).

If it is determined in the step S501 that a query about the search has been received (YES to the step S501), the image input apparatus 102 refers to the hardware information 221 stored in the external memory 220. Then, the image input apparatus 102 sends a response to the information processing apparatus 101 (step S502), and the process returns to the step S500.

On the other hand, if it is determined in the step S501 that no query about the search has been received (NO to the step S501), it is determined whether or not a scan job has been received from the information processing apparatus 101 (step S503). If it is determined in the step S503 that no scan job has been received (NO to the step S503), the process returns to the step S500.

On the other hand, if it is determined in the step S503 that a scan job has been received (YES to the step S503), the image input apparatus 102 performs the scan operation and the image data transfer to the information processing apparatus 101 (step S504).

Then, it is determined whether or not the data transfer is completed (step S505). This determination is performed by determining whether or not a termination command has been received from the information processing apparatus 101 within a predetermined time period.

If it is determined in the step S505 that a termination command has been received (YES to the step S505), the present process is terminated. On the other hand, if it is determined in the step S505 that no termination command has been received (NO to the step S505), the image input apparatus 102 transmits error information to the information processing apparatus 101 (step S506), followed by terminating the present process.

According to the process in FIG. 12, the image input apparatus 102 receives a notification indicative of the search for the image input apparatuses 102 from the server apparatus 103. Next, the image input apparatus 102 transmits response information including hardware information on the image input apparatus 102 to the server apparatus 103. Then, the image input apparatus 102 receives a job message from the server apparatus 103 via the information processing apparatus 101, for operating according to operation settings indicated by a setting message set by the information processing apparatus 101. The image input apparatus 102 transmits image data obtained by the operation according to the received job message to the server apparatus 103 via the information processing apparatus 101, and hence it is possible to provide an image input apparatus for enabling a user to easily use an image input apparatus.

Figure 13:
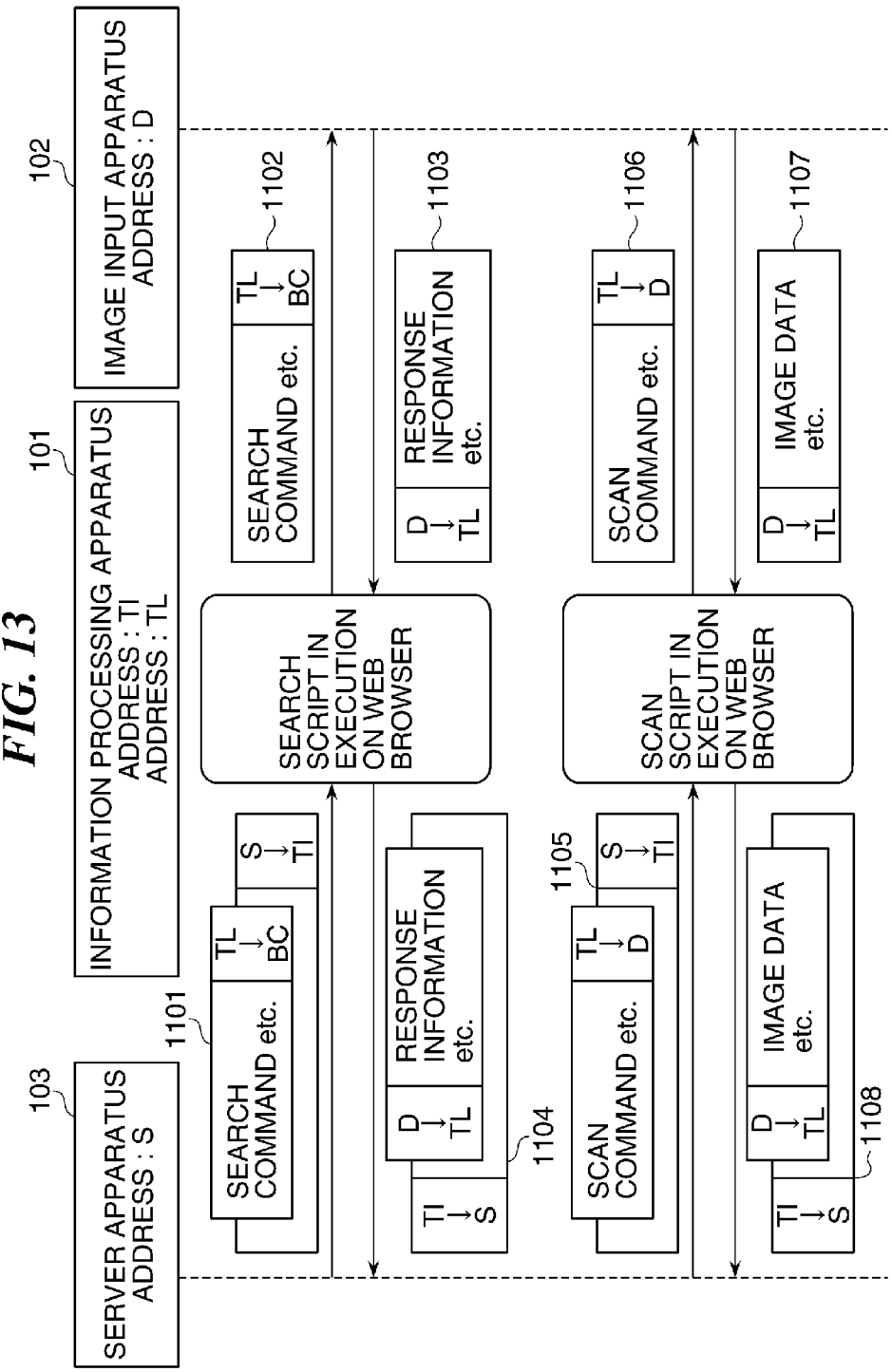
FIG. 13 is a diagram showing an example of data transmission and reception performed according to a search script and a scan script when the search script and the scan script of the server apparatus are executed on a web browser of the information processing apparatus, and contents of transmitted and received data.

FIG. 13 is a diagram showing an example of the contents of data which are transmitted and received, and processing of data transmission and reception performed by the search script 325 and the scan script 328 when the search script 325 and the scan script 328 of the server apparatus 103 are executed by the web browser 133 of the information processing apparatus 101.

In FIG. 13, first, a description will be given of a network address. An address of the server apparatus 103 connected to the Internet 107 via the network interface 307 is represented by S. A network address of the information processing apparatus 101 in the network 106 for connecting to the server apparatus via the Internet 107 connected via the first communication interface 114 is represented by TI. A network address of the information processing apparatus 101 used when the second communication interface 119 is connected to the local network 104 is represented by TL. A network address of the image input apparatus 102 used when the image input apparatus 102 is connected to the local network 104 via the network interface 205 is represented by D.

Next, a description will be given of a representative example of data transmitted and received by the scripts. Data 1101 is an example of data transmitted as a search protocol-based message from the server apparatus 103 to the search script being executed by the web browser 133 of the information processing apparatus 101 in the step S205 in FIG. 4.

The server apparatus 103 creates the data 1101 such that it has a structure in which information for transmitting the data 1101 to the local network 104 is included in the header of packet data which contains a search command or the like as payload. To transmit the entire data from the server apparatus 103 to the information processing apparatus 101, the data is created such that the header of the data defines transmission from the network address S to the network address TI.

The search script of the information processing apparatus 101 which has received the packet data including the data 1101 takes out only contained packet data, and transfers the packet data to the local network 104 as data 1102. As shown in FIG. 13, the packet data in this case is addressed to BC. It is assumed that the destination BC indicates broadcast transmission. Through the taking out of packet data executed by the search script, as described above, the broadcasting of the search protocol-based message in the step S206 in FIG. 4 is realized.

Data 1103 is an example of packet data sent by the image input apparatus 102 as a response to the search command. The data 1103 has a header for transmission thereof from the network address D of the image input apparatus 102 to the network address TL of the information processing apparatus 101 on the local network 104. Further, the payload contains response information including the hardware information 221.

The search script having received the packet data of the data 1103 generates packet data containing the data 1103. The search script transfers the generated data as data 1104 from the network address TI to the network address S of the server apparatus 103. The network address TI is the address of the information processing apparatus 101 on the network 106 connected to the server apparatus 103 via the Internet 107.

By transmitting the data having the above-mentioned packet data structure to the server apparatus 103, the server apparatus 103 can acquire the network address TL of the information processing apparatus 101 on the local network 104. Similarly, the server apparatus 103 can acquire the network address D of the image input apparatus 102 having sent the response to the search command.

Data 1105 is an example of a scan job message in the step S222 in FIG. 4. The data 1105 has the same packet data structure as the data 1101. More specifically, the data 1105 is created such that the header of packet data, which contains e.g. a scan command as the payload, includes information for transmission to the local network 104. To transmit the entire data from the server apparatus 103 to the information processing apparatus 101, the data is created such that the header thereof defines transmission from the network address S to the network address TI.

The scan script having received the packet data of the data 1105 takes out only contained packet data, and transfers the taken-out packet data to the local network 104 as data 1106.

The server apparatus 103 has already acquired, from the data 1104, the network address TL of the information processing apparatus 101 on the local network 104 and the network address D of the image input apparatus 102 having sent the response to the search command. The data 1105 is created using these addresses, and hence the scan script can easily create data which can be transmitted to the local network 104 only by routinely taking out the contained packet data.

Data 1107 is an example of packet data transmitted by the image input apparatus 102 as image data generated as a result of the scan operation. The data 1107 has a header for transmission from the network address D of the image input apparatus 102 to the network address TL of the information processing apparatus 101 on the local network 104. Further, the data 1107 contains image data information and the like in the payload.

The scan script having received the packet data of the data 1107 generates packet data containing the data 1107. The scan script transfers the generated packet data from the network address TI to the server apparatus 103 as data 1108.

Note that the data 1107 is generated as each of divisional data items obtained by dividing the whole image data according to designation of the scan command. Further, the scan script sequentially processes the packets which correspond to the divisional data items of the data 1107 and are sent in a plurality of respective times. By transmitting each data to the server apparatus 103 with a data structure indicated by the data 1108, it is possible to process the packet data even when the capacity of the RAM 112 of the information processing apparatus 101 used by the scan script is small.

Although not described in detail here, when the control of a network port is required, switching of the network port is described in a destination part of packet data together with a network address. This enables each script to cope with control of the network port by performing packet data generation including the conversion of the destination part.

Further, the search script and the scan script in the present embodiment can execute other functions. The scan script displays the scan setting screen 800 shown in FIG. 7, and transmits information set by the user to the server apparatus 103 as a message.

The search script and the scan script periodically check the status of the server apparatus 103 to thereby periodically check the server apparatus 103 as to whether or not update of the display contents is necessary. The server apparatus 103 sends a notification e.g. of error handling in the server apparatus 103 to the information processing apparatus 101 as a message, whereby the search script and the scan script can operate according to the message.

In the above-described embodiment, communication between the server apparatus and the image input apparatus via the information processing apparatus may be performed by any method insofar as it can be executed by the information processing apparatus. More specifically, communication may be performed using the ActiveX control, the Java (registered trademark) script, the Java (registered trademark) applet, or any of various types of plug-ins. However, it is efficient to perform preparations to be executed in the information processing apparatus in order of priority, because the server apparatus has choices of a plurality of execution methods, and is not required to have a function of an apparatus which is most frequently used.

Further, to easily and efficiently perform bi-directional communication, it is also effective to use a bi-directional communication technique, such as Websockets http://dev.W3.Org/html5/WebSockets. When the technique e.g. of WebSockets is introduced, it is unnecessary to perform such processing as described above in which a script periodically sends an HTML file update request message to the server apparatus 103. Further, it is possible to update a message sent from the server apparatus 103 without a request from the information processing apparatus 101.

Although a protocol defined by WS-Eventing is employed as a protocol for sending a notification, this is not limitative. For example, it is also possible to realize the communication e.g. by using GENA (general event notification architecture) as a protocol for sending a notification.

Further, the search script operating on the information processing apparatus 101 can be operated using any suitable protocol insofar as the protocol is capable of properly notifying the search script of hardware information and makes it possible to obtain the same result. Therefore, the present invention is not limited to the above-described embodiment.

Further, as a method of performing a scan operation in an image input apparatus, the above-described embodiment employs a method of generating a scan job and transmitting the generated scan job to the image input apparatus. However, if it is possible to transmit general information, such as a scan job ticket, to an image input apparatus, it is also possible to perform the scan processing by employing this method.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

101 information processing apparatus
102 image input apparatus
103 server apparatus
111, 202, 301 CPU
112, 203, 302 RAM
113, 204, 303 ROM
116, 304 display section interface
117 operating section interface
120, 308 display section
121 operating section 130 external memory
131, 321 OS
132 application
133 web browser
208 printer interface
209 printing unit
210 scanner interface
211 scanning unit
220, 320 external memory
221 hardware information
322 web service library
323 scan processing-related programs
324 search program
325 search script
326 image input apparatus management program
327 scan job creation program
328 scan script
329 image reception program
600 search-in-progress screen
700 image input apparatus selection screen
800 scan setting screen
900 scan-in-progress screen
1000 scan operation completed screen

The invention claimed is:

1. A server apparatus that is capable of communicating with an information processing apparatus, comprising:

at least one non-transitory memory device;

at least one processor;

a list providing unit configured to create a list of image input apparatuses according to search results received from the information processing apparatus, and provide the list to the information processing apparatus;

a script providing unit configured to provide script information including information for use in configuring settings of an operation of an image input apparatus selected on the information processing apparatus from the list provided by the list providing unit, to the information processing apparatus;

a receiving unit configured to receive operation settings set through a setting screen displayed by the information processing apparatus based on the script information provided by the script providing unit;

a setting information-transmitting unit configured to transmit a job message, to the information processing apparatus, for use in causing the image input apparatus to operate according to the operation settings received by the receiving unit, in order to cause the information processing apparatus to transfer the job message to the image input apparatus; and a storage unit configured to acquire image data input by the operation of the image input apparatus according to the job message, and store the acquired image data, the acquired image data having been acquired via the information processing apparatus, wherein the list providing unit, the script providing unit, the receiving unit, the setting information-transmitting unit, and the storage unit are implemented at least in part by the at least one processor executing a program recorded on the at least one non-transitory memory device.

2. The server apparatus according to claim 1, wherein when image data storage processing is completed by the storage unit, a termination message including a reduced image obtained by reducing the image data is transmitted to the information processing apparatus.

3. A method of controlling a server apparatus that is capable of communicating with an information processing apparatus, comprising:

creating a list of image input apparatuses according to search results received from the information processing apparatus, and providing the list to the information processing apparatus;

providing script information including information for use in configuring settings of an operation of an image input apparatus selected on the information processing apparatus from the list, to the information processing apparatus;

receiving operation settings set through a setting screen displayed by the information processing apparatus based on the provided script information;

transmitting a job message, to the information processing apparatus, for use in causing the image input apparatus to operate according to the received operation settings, in order to cause the information processing apparatus to transfer the job message to the image input apparatus; and a storage unit configured to acquire image data input by the operation of the image input apparatus according to the job message, and store the acquired image data, the acquired image data having been acquired via the information processing apparatus.

receiving image data input by the operation of the image input apparatus according to the job message, from the image input apparatus, and transferring the received image data to the server apparatus.

4. A non-transitory computer-readable storage medium storing a control program for causing a computer to execute the method of controlling a server apparatus according to claim 3.

* * * * *